(12) United States Patent
Kwon et al.

(10) Patent No.: US 8,526,531 B2
(45) Date of Patent: Sep. 3, 2013

(54) APPARATUS AND METHOD FOR SELECTION OF PRECODING MATRIX

(75) Inventors: Dong Seung Kwon, Daejeon (KR); Byung-Jae Kwak, Seoul (KR); Young Seog Song, Daejeon (KR); Seung Joon Lee, Daejeon (KR); Ji Hyung Kim, Daejeon (KR); Choong Il Yeh, Daejeon (KR); Wooram Shin, Daejeon (KR); Chung Gu Kang, Seoul (KR); Jin-Woo Kim, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 285 days.

(21) Appl. No.: 12/736,590

(22) PCT Filed: Apr. 22, 2009

(86) PCT No.: PCT/KR2009/002096
§ 371 (c)(1),
(2), (4) Date: Oct. 21, 2010

(87) PCT Pub. No.: WO2009/131373
PCT Pub. Date: Oct. 29, 2009

(65) Prior Publication Data
US 2011/0033010 A1 Feb. 10, 2011

(30) Foreign Application Priority Data

Apr. 22, 2008 (KR) .................. 10-2008-0037173
Mar. 12, 2009 (KR) .................. 10-2009-0021248

(51) Int. Cl.
*H04L 25/03* (2006.01)

(52) U.S. Cl.
USPC .................. 375/296; 375/285; 375/260

(58) Field of Classification Search
USPC .............. 375/296, 285, 346, 260, 299, 259, 375/267; 342/373; 455/501
See application file for complete search history.

(56) References Cited

U.S. PATENT DOCUMENTS

| 8,064,428 B2 | 11/2011 | Bar-Ness et al. |
| 2007/0115864 A1 | 5/2007 | Bar-Ness et al. |

(Continued)

FOREIGN PATENT DOCUMENTS

| EP | 1699145 A2 | 9/2006 |
| EP | 1821440 A1 | 8/2007 |

(Continued)

OTHER PUBLICATIONS

International Search Report and Written Opinion of International Searching Authority dated Oct. 27, 2009 in relation to International Application No. PCT/KR2009/02096.

(Continued)

*Primary Examiner* — Shuwang Liu
*Assistant Examiner* — Helene Tayong

(57) ABSTRACT

The present invention relates to an apparatus and a method for selection of a precoding matrix. In the present invention, a precoding matrix to enable an effective signal-to-noise ratio (ESNR) to have a maximum value with respect to a signal vector that requires retransmission is selected in a codebook and fed back to a transmitter. Accordingly, since the effective signal-to-noise ratio has the maximum value after the signal vector is retransmitted, it is possible to minimize a reception error probability of retransmission.

17 Claims, 2 Drawing Sheets

(56) References Cited

U.S. PATENT DOCUMENTS

| | | | |
|---|---|---|---|
| 2007/0165738 A1* | 7/2007 | Barriac et al. | 375/267 |
| 2007/0183380 A1 | 8/2007 | Rensburg et al. | |
| 2007/0280386 A1* | 12/2007 | Waes et al. | 375/347 |
| 2008/0112500 A1* | 5/2008 | Pan et al. | 375/267 |
| 2008/0256410 A1 | 10/2008 | Park et al. | |
| 2009/0195453 A1* | 8/2009 | Kim | 342/373 |
| 2009/0202014 A1* | 8/2009 | Mujtaba et al. | 375/267 |
| 2009/0304109 A1* | 12/2009 | Kotecha | 375/299 |
| 2011/0110403 A1* | 5/2011 | Jongren | 375/219 |
| 2012/0069919 A1* | 3/2012 | Clerckx et al. | 375/259 |

FOREIGN PATENT DOCUMENTS

| | | |
|---|---|---|
| KR | 1020070019586 A | 2/2007 |
| KR | 1020070034426 A | 3/2007 |
| WO | WO 2007/149048 | 12/2007 |
| WO | WO 2008/023922 A1 | 2/2008 |

OTHER PUBLICATIONS

Haitong Sun, et al: "Progressive Linear Precoder Optimization for MIMO Packet Retransmissions", IEEE Journal on selected areas in communications, vol. 24, No. 3, pp. 448-456, Mar. 2006.

Supplementary European Search Report dated Jul. 20, 2011 in connection with European Patent Applictaion No. EP 09 73 4347.

Harvind Samra, et al., "Capacity and Linear Precoding for Packet Retransmissions", 2005 IEEE, p. 541-544.

Jianzhong (Charlie) Zhang, et al., "Closed-Loop MIMO Precoding with CQICH Feedbacks", Jan. 10, 2005, 13 pages.

Kan Zheng, et al., "Linear Space-time Precoder with Hybrid ARQ Transmission", 2007 IEEE, p. 3543-3547.

* cited by examiner

APPARATUS AND METHOD FOR SELECTION OF PRECODING MATRIX

CROSS-REFERENCE TO RELATED APPLICATION(S)

The present application is related to International Application No. PCT/KR2009/02096 filed Apr. 22, 2009 entitled "APPARATUS AND METHOD FOR SELECTION OF PRECODING MATRIX" which claims priority to Korean Patent Application Nos. 10-2008-0037173 filed Apr. 22, 2008 and 10-2009-0021248 filed Mar. 12, 2009. International Application No. PCT/KR2009/002096 is assigned to the assignee of the present application and is hereby incorporated by reference into the present disclosure as if fully set forth herein. The present application hereby claims priority under 35 U.S.C. §119(a) to International Patent Application No. PCT/KR2009/002096 and Korean Patent Application Nos. 10-2008-0037173 and 10-2009-0021248.

TECHNICAL FIELD

The present invention relates to an apparatus and a method for selection of a precoding matrix, and more particularly, to an apparatus and a method for selection of a precoding matrix for a linear precoding scheme in a codebook-based closed loop multi-input multi-output (hereinafter referred to as "MIMO") system using a hybrid automatic repeat request (hereinafter referred to as "HARQ") protocol.

BACKGROUND ART

A codebook-based linear precoding scheme in a closed loop multi-antenna communication system is a method of multiplying a transmission signal vector by a matrix selected from a codebook which is a set of a plurality of predefined precoding matrices to transmit it to a plurality of antennas. A receiver selects the precoding matrix in the codebook through channel state information, and an index of the precoding matrix selected by the receiver is fed back to a transmitter. Herein, since the transmitter does not need to have access to the channel state information, the transmitter can be implemented by a low feedback overhead.

A HARQ technique requests retransmission by feeding back a negative acknowledgment (NAK) message to the transmitter at occurrence of an error after judging whether or not a received packet is received without the error by using a cyclic redundancy check (hereinafter referred to as "CRC") code. The HARQ technique is a scheme that enhances an error probability by combining reception information of a previously received packet and reception information on a newly retransmitted packet.

When the same scheme of selecting a precoding matrix as the initial transmission is used at the time of selecting the precoding matrix in retransmission due to an initial transmission error in the case in which the HARQ technique is adopted in the codebook-based linear precoding scheme, a diversity combining gain cannot be sufficiently obtained through the retransmission. It is possible to select an optimum precoding matrix by utilizing reception information of the initial transmission at the time of using the precoding matrix to be used for the retransmission in the codebook.

In the case of using the related art so as to select the precoding matrix for maximizing the diversity combining gain in the retransmission, the transmitter must have access to the channel state information and must be adopted only in a combining scheme that is capable of concatenating reception signal vectors.

Further, only when channel states in the initial transmission and the retransmission are the same, a study of characteristics of the precoding matrix used for the initial transmission and the retransmission is performed. When corresponding vectors of the precoding matrices used for the initial transmission and the retransmission must have orthogonality, the diversity gain is maximized.

However, the characteristic is generally not satisfied by the codebook and is available only in the case in which a precondition that the channel state must be the same in the initial transmission and the retransmission is satisfied.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an apparatus and a method for selection of a precoding matrix having advantages of being used for retransmission in a codebook-based linear precoding scheme.

Technical Solution

An exemplary embodiment of the present invention provides a method for selection of a precoding matrix, including:
judging whether or not a signal vector has an error by combining a previously stored first signal vector and a second signal vector received from a transmitter; calculating effective signal-to-noise ratios with respect to a plurality of all possible precoding matrices in a codebook when the second signal vector has an error; and selecting a precoding matrix in which the effective signal-to-noise ratio has a maximum value among the calculated effective signal-to-noise ratios as a precoding matrix to be used to retransmit the second signal vector and transmitting information on the selected precoding matrix to the transmitter.

Another embodiment of the present invention provides an apparatus for selection of a precoding matrix, including:
a combining unit that checks whether or not a second signal vector has an error by combining a first buffering signal vector and the second signal vector that is received from a transmitter; and a calculation unit that calculates an effective signal-to-noise ratio for selecting a precoding matrix to be used for retransmission of the second signal vector to the transmitter in accordance with the combining scheme of the first signal vector and the second signal vector and selects the precoding matrix.

Advantageous Effects

According to the above-mentioned embodiments, it is possible to minimize an error probability of a signal vector to be retransmitted by selecting a precoding matrix in which an effective signal-to-noise ratio has the maximum value in a codebook and feeding back the precoding matrix to a transmitter when initial transmission has failed, and thus the signal vector is retransmitted.

MODE FOR THE INVENTION

Figure 1:
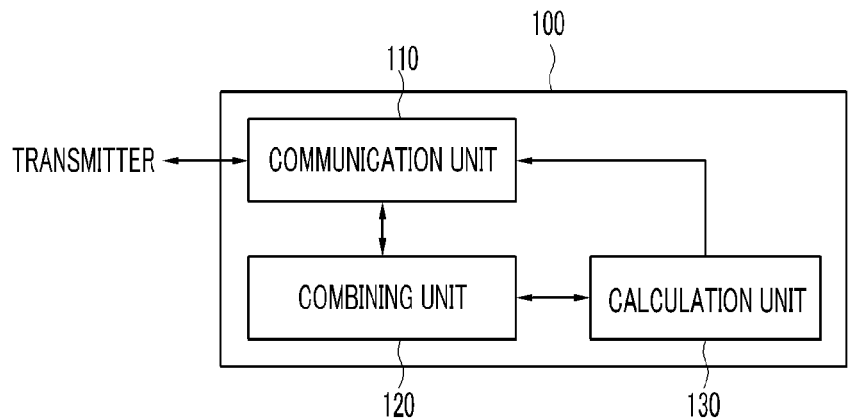
FIG. 1 is a configuration diagram of an apparatus for selection of a precoding matrix according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, an apparatus and a method for selection of a precoding matrix according to an exemplary embodiment of the present invention will be described in detail with reference to the accompanying drawings.

FIG. 1 is a configuration diagram of an apparatus for selection of a precoding matrix according to an exemplary embodiment of the present invention.

As shown in FIG. 1, the precoding matrix selection apparatus 100 according to an embodiment of the present invention includes a communication unit 110, a combining unit 120, and a calculation unit 130.

The communication unit 110 is connected with a transmitter to transmit and receive a signal vector or a retransmission request signal.

The combining unit 120 buffers a reception signal vector that requests retransmission among reception signal vectors transmitted from the transmitter. The reception signal vector retransmitted from the transmitter by the retransmission request and the buffering reception signal vector are combined. Herein, any one of various methods may be used as a method of combining the signal vectors, and this will be described below.

The calculation unit 130 calculates an effective signal-to-noise ratio (hereinafter referred to as "ESNR") so as to select the precoding matrix to be used for re-transmission at the time of requesting the retransmission with respect to the reception signal vector that is requested to be retransmitted by decoding the reception signal vector received through the communication unit 110. At this time, the ESNR is calculated with respect to all possible precoding matrices in a codebook, and the re-transmission is requested through the communication unit 110 by selecting the precoding matrix in which the ESNR has the maximum value.

A method for selection of a precoding matrix through the precoding matrix selection apparatus consisting of the above-mentioned constituent members will be described with reference to FIG. 2.

Figure 2:
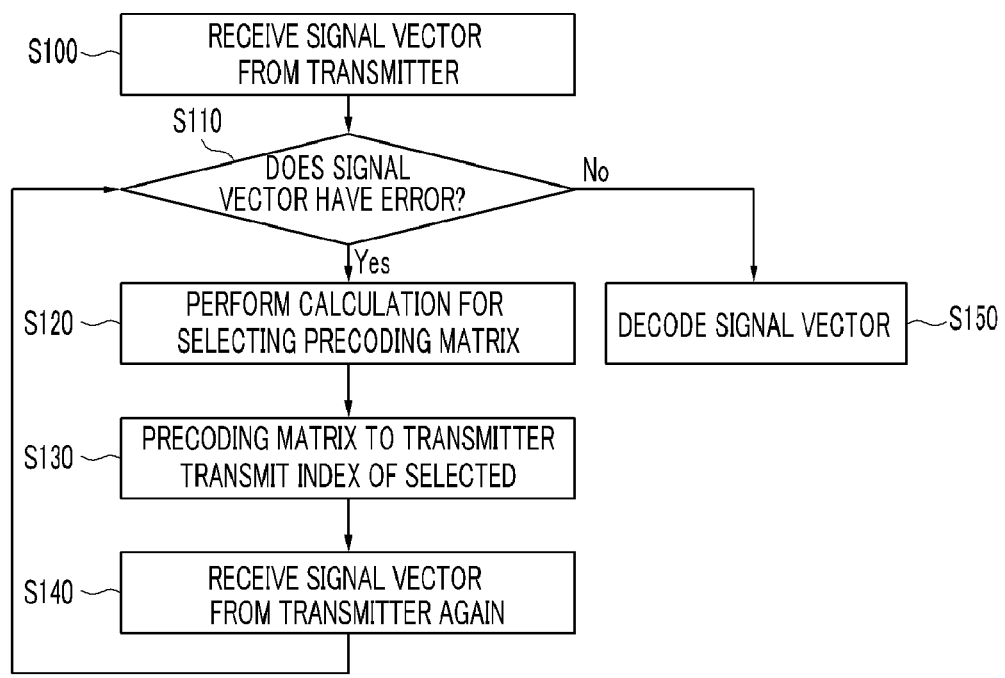
FIG. 2 is a flowchart of selecting a precoding matrix according to an exemplary embodiment of the present invention.

FIG. 2 is a flowchart of selecting a precoding matrix according to an exemplary embodiment of the present invention.

As shown in FIG. 2, when a signal vector is received from the transmitter through the communication unit 110 (S100), the combining unit 120 judges whether or not the corresponding signal vector has an error (S110). Herein, in the exemplary embodiment of the present invention, a case in which the existence or nonexistence of an error is determined using a CRC code is described as an example, but is not limited thereto. The CRC code is known to those skilled in the art, so a detailed description thereof will be omitted in the exemplary embodiment of the present invention.

As a determination result at step S110, if it is determined that the signal vector has no error, the combining unit 120 finds information from the signal vector received by decoding the signal vector (S150). However, if it is determined that the signal vector has an error, the calculation unit 130 performs calculation for selection of the precoding matrix (S120). The precoding matrix selection apparatus 100 uses a reception signal of a previous signal vector and reception information of a current signal vector so as to select the precoding matrix, and when firstly receiving the signal vector, the precoding matrix selection apparatus 100 selects the precoding matrix by using only the reception information of the current signal vector.

Thereafter, an index of the selected precoding matrix is transmitted to the transmitter through the communication unit 110 (S130) and retransmission of the signal vector having the error is requested, and at the same time, the signal vector having the error is buffered. The transmitter that is requested to retransmit the signal vector transmits the corresponding signal vector to the receiver and receives the signal vector from the transmitter again (S140). The combining unit 130 of the receiver that receives the signal vector again performs steps from step S110 again and repeats the steps until the received signal vector does not have the error after combining the buffering signal vector that is previously received and the re-received signal vector.

At this time, the calculation that the calculation unit 130 performs for selection of the precoding matrix has different ESNR calculation processes in accordance with the combining scheme used in the combining unit 120. In the exemplary embodiment of the present invention, three combining schemes including a concatenation combining scheme, a pre-combining scheme, and a post-combining scheme are described as examples, but the exemplary embodiment of the present invention is not limited thereto. In addition, the combining scheme is previously determined before designing a system, and the signal vectors may be combined with each other by using any one of the three combining schemes.

First, when the combining unit 120 uses the concatenation combining scheme, a transmission and reception signal vector relationship shown in Equation 1 is formed.

$$y = \begin{bmatrix} y_1 \\ y_2 \\ \vdots \\ y_L \end{bmatrix} = \begin{bmatrix} H_1F_1 \\ H_2F_2 \\ \vdots \\ H_LF_L \end{bmatrix} s + \begin{bmatrix} w_1 \\ w_2 \\ \vdots \\ w_L \end{bmatrix} \quad \text{(Equation 1)}$$

$$= H_{CONC}s + w$$

At this time, $H_l$ and $F_l$ represent a channel matrix and a precoding matrix in an l-th transmission, and $w_l$ represents a thermal noise vector in the l-th transmission. s is the transmission signal vector and y is the signal vector that passes through the con-catenation process in the combining unit 120. An effective channel matrix is represented by $H_{CONC}$ after the combining process in the combining unit 120.

After the effective channel matrix is acquired, a post detection SNR (PDSNR) must be first calculated so as to acquire the effective signal-to-noise ratio, and Equation 2 is used so as to calculate the PDSNR.

$$\gamma_i = \frac{|g_i \tilde{h}_i|^2 \sigma_s^2}{\sum_{j \neq i}^{N_T} |g_j \tilde{h}_i|^2 \sigma_s^2 + \|g_i\|^2 \sigma_w^2} \quad \text{(Equation 2)}$$

Herein, $g_i$ and
$\tilde{h}_i$
represent an i-th row constituting a linear receiver matrix G and a j-th column constituting the effective channel matrix $H_{CONC}$, respectively. In addition,
$\sigma_s^2$
and
$\sigma_w^2$
represent dispersion of the reception signal and dispersion of the thermal noise, respectively.

When calculation is performed with respect to all i's of the 'linear receiver matrix G, a post detection SNR vector
$\underline{\gamma}$
is configured. At this time, the linear receiver matrix G is given as shown in Equation 3 in the case of following a minimum mean square error (referred to as "MMSE") criterion. In addition, the linear receiver matrix G does not need to follow the MMSE criterion.

$$G_L = (H_{CONC}^H H_{CONC} + I_{N_T}/\bar{\gamma})^{-1} H_{CONC}^H$$

Herein,
$\bar{\gamma}$
represents an average reception signal-to-noise ratio.

In the case in which the combining unit 120 uses the pre-combining scheme as another example of the combining scheme, the effective channel matrix after the combining process is given as shown in Equation 4.

$$\tilde{H}_{PRE} = \sum_{l=1}^{L} \tilde{H}_l^H \tilde{H}_l \quad \text{(Equation 4)}$$

Herein,
$\tilde{H}_l$
is an effective channel in l-th transmission.
$\tilde{H}_l = H_l F_l$ At this time, calculation of the linear receiver matrix G is shown in Equation 3. The linear receiver matrix G represents a matrix that is multiplied by the reception vector y to detect the original signal s.

In the case in which the combining unit 120 uses the post-combining scheme as further another example of the combining scheme, the effective channel matrix after the combining process is given as shown in Equation 5.

$$\hat{s} = \frac{1}{L} \sum_{l=1}^{L} G_l y_l \quad \text{(Equation 5)}$$

Herein, L represents the total number of transmission times.

At this time, calculation of the linear receiver matrix G is shown in Equation 3.

As described above, after the linear receiver matrix G is calculated, a final post detection SNR vector can be acquired as shown in Equation 6.

$$\underline{\gamma}_{POST} = \sum_{l=1}^{L} \underline{\gamma}_l \quad \text{(Equation 6)}$$

Post detection SNR vectors aggregated in Equation 6 are calculated through Equation 2.

Meanwhile, the effective signal-to-noise ratio is given as the function of $\underline{\gamma}$
and various schemes are known as the calculation scheme thereof. When a case of utilizing a Shannon's capacitance formula among various schemes is described as an example, the effective signal-to-noise ratio is calculated in Equation 7.

$$\gamma_{\text{eff}} = 2^{\frac{1}{N_T} \sum_{i=1}^{N_T} \log_2(1+\gamma_i)} - 1 \quad \text{(Equation 7)}$$

After the (L−1)-th reception has failed and a precoding matrix $F_L$ to be used at the time of trying L-th transmission calculates the effective signal-to-noise ratio by using Equation 7 with respect to all possible precoding matrices in the codebook, a precoding matrix that maximizes the effective signal-to-noise ratio is selected from the calculated effective signal-to-noise ratios.

Next, performance improvement of a system according to an exemplary embodiment will be described with reference to FIGS. 3 and 4.

Figure 3:
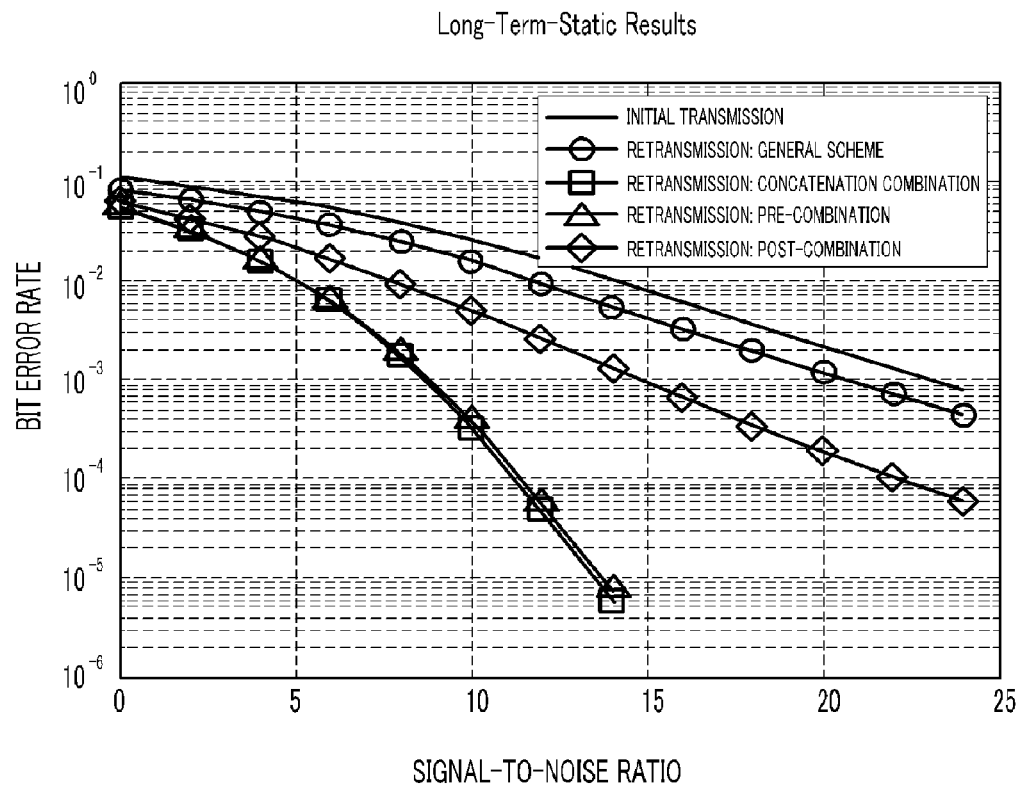
FIG. 3 is an exemplary diagram illustrating a performance result according to a first exemplary embodiment of the present invention.
Figure 4:
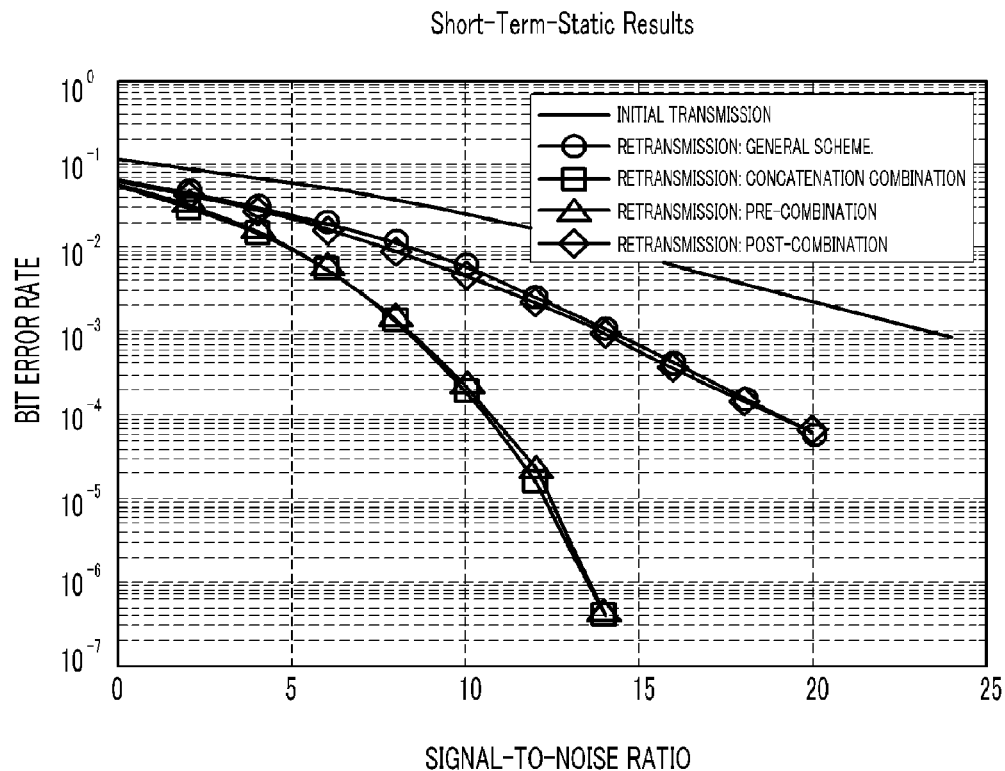
FIG. 4 is an exemplary diagram illustrating a performance result according to a second exemplary embodiment of the present invention.

FIG. 3 is an exemplary diagram illustrating a performance result according to a first exemplary embodiment of the present invention, and FIG. 4 is an exemplary diagram illustrating a performance result according to a second exemplary embodiment of the present invention.

FIG. 3 is a graph illustrating the performance results of the system for initial transmission, a general scheme to which the embodiment of the present invention is not applied, and the combining schemes (concatenation scheme, pre-combining scheme, and post-combining scheme) in an environment in which a channel state is not changed while the signal vector is transmitted according to an exemplary embodiment of the present invention.

FIG. 3 shows statistical results for the long term, wherein the horizontal axis represents a signal-to-noise ratio and the vertical axis represents a bit error rate. Magnitudes of gains are different depending on the combining scheme, but the error probability is remarkably enhanced in comparison with the general scheme to which the exemplary embodiment of the present is not applied.

Meanwhile, FIG. 4 is a graph illustrating the performance results of the system for initial transmission, a general scheme, and the combining schemes (concatenation scheme, pre-combining scheme, and the post-combining scheme) in an environment in which the channel state is independently changed during the retransmission is made according to an exemplary embodiment of the present invention.

FIG. 4 shows statistical results for the short term, wherein the horizontal axis represents the signal-to-noise ratio and the vertical axis represents the bit error rate. The magnitudes of gains are different depending on the combining scheme such as the concatenation scheme, the pre-combining scheme, or the post-combining scheme, but the error probability is remarkably enhanced in comparison with the general scheme to which the exemplary embodiment of the present is not applied.

The exemplary embodiments of the present invention are implemented through only the apparatus and method, but may be implemented through a program that realizes functions corresponding to constituent members of the exemplary embodiments of the present invention or a recording medium in which the program is recorded. The implementation will be easily implemented by those skilled in the art as described in the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for precoding matrix selection, comprising:
   judging whether a signal vector includes an error by combining a previously stored first signal vector and a second signal vector received from a transmitter;
   calculating effective signal-to-noise ratios with respect to a plurality of precoding matrices in a codebook when the second signal vector includes the error, wherein calculating the effective signal-to-noise ratio includes:
      calculating post detection signal noise ratio vectors from an effective channel matrix in accordance with the combining of the first signal vector and the second signal vector; and
      calculating the effective signal-to-noise ratio by aggregating the calculated post detection signal-to-noise ratio vectors; and
   selecting a precoding matrix in which the effective signal-to-noise ratio has the maximum value among the calculated effective signal-to-noise ratios as the precoding matrix to be used to retransmit the second signal vector and transmitting information regarding the selected precoding matrix to the transmitter.

2. The method of claim 1, wherein:
   the first signal vector is a signal vector that has already been received from the transmitter and is buffered when the first signal vector has the error; and
   the second signal vector is a signal vector received from the transmitter by requesting retransmission of the transmitter due to the error of the first signal vector.

3. The method of claim 2, further comprising:
   when the second signal is a signal vector that is initially transmitted from the transmitter, judging whether the second signal vector has an error by using a cyclic redundancy check code.

4. The method of claim 1, wherein the first signal vector and the second signal vector are combined with each other by using a combining scheme selected from one of: a concatenation combining scheme; a pre-combining scheme; and a post-combining scheme.

5. The method of claim 4, further comprising: when the combining scheme is the concatenation combining scheme, acquiring the effective channel matrix on the basis of a channel matrix, a precoding matrix, and a thermal noise vector when the first signal vector is transmitted.

6. The method of claim 1, further comprising:
   repeating the method until no error is included in a signal vector received from the transmitter.

7. An apparatus capable of precoding matrix selection, the apparatus comprising:
   a combining unit configured to determine whether a second signal vector includes an error by combining a first signal vector and the second signal vector that is received from a transmitter; and
   a calculation unit configured to calculate an effective signal-to-noise ratio for selecting a precoding matrix to be used for retransmission of the second signal vector to the transmitter in accordance with the combining of the first signal vector and the second signal vector, and configured to select the precoding matrix based on the calculated effective signal-to-noise ratio,
   wherein the calculation unit is configured to calculate the effective signal-to-noise ratio by calculating post detection signal noise ratio vectors from an effective channel matrix in accordance with the combining of the first signal vector and the second signal vector, and calculating the effective signal-to-noise ratio by aggregating the calculated post detection signal-to-noise ratio vectors.

8. The apparatus of claim 7, further comprising:
   a communication unit configured to at least one of:
      receive a signal vector from the transmitter; or
      request retransmission of the signal vector from the transmitter by transmitting information on the selected precoding matrix.

9. The apparatus of claim 7, wherein:
   the first signal vector is a signal vector that previously has been received from the transmitter and is buffered when the first signal vector includes the error, and the second signal vector is a signal vector received from the transmitter by requesting retransmission of the transmitter due to the error of the first signal vector, and
   when the second signal is a signal vector that is initially transmitted, the combining unit is configured to judge whether the second signal vector includes an error by using a cyclic redundancy check code.

10. The apparatus of claim 7, wherein the first signal vector and the second signal vector are combined with each other by using a combining scheme selected from one of: a concatenation combining scheme; a pre-combining scheme; and a post-combining scheme.

11. The apparatus of claim 10, further comprising: when the combining scheme is the concatenation combining scheme, the calculation unit is configured to acquire the effective channel matrix based on the basis of a channel matrix, a precoding matrix, and a thermal noise vector when the first signal vector is transmitted.

12. A communication terminal capable of communicating in a wireless communication network, the communication terminal comprising:
   a precoding matrix selecting apparatus configured to select a precoding matrix, the precoding matrix selecting apparatus comprising:
      a combining unit configured to determine whether a second signal vector includes an error by combining a first signal vector and the second signal vector that is received from a transmitter; and a calculation unit configured to calculate an effective signal-to-noise ratio for selecting the precoding matrix to be used for retransmission of the second signal vector to the transmitter in accordance with the combining of the first signal vector and the second signal vector and configured to select the precoding matrix based on the calculated effective signal-to-noise ratio, wherein the calculation unit is configured to calculate the effective signal-to-noise ratio by calculating post detection signal noise ratio vectors from an effective channel matrix in accordance with the combining of the first signal vector and the second signal vector; and calculating the effective signal-to-noise ratio by aggregating the calculated post detection signal-to-noise ratio vectors.

13. The communication terminal of claim 12, further comprising:

a communication unit configured to at least one of:
receive a signal vector from the transmitter; or
request retransmission of the signal vector from the transmitter by transmitting information on the selected precoding matrix.

14. The communication terminal of claim 12, wherein:
the first signal vector is a signal vector that previously has been received from the transmitter and is buffered when the first signal vector includes the error, and the second signal vector is a signal vector received from the transmitter by requesting retransmission of the transmitter due to the error of the first signal vector, and when the second signal is a signal vector that is initially transmitted, the combining unit is configured to judge whether the second signal vector includes an error by using a cyclic redundancy check code.

15. The communication terminal of claim 12, wherein the first signal vector and the second signal vector are combined with each other by using a combining scheme selected from one of: a concatenation combining scheme; a pre-combining scheme; and a post-combining scheme.

16. The communication terminal of claim 15, further comprising: when the combining scheme is the concatenation combining scheme, the calculation unit is configured to acquire the effective channel matrix based on the basis of a channel matrix, a precoding matrix, and a thermal noise vector when the first signal vector is transmitted.

17. The communication terminal of claim 12, wherein the precoding matrix selection apparatus is configured to repeatedly determine whether the second signal vector includes an error and calculate the effective signal-to-noise ratio for selecting the precoding matrix until no error is included in a signal vector received from the transmitter.

* * * * *